Dec. 24, 1935.   M. H. ROBERTS   2,025,126
LOCOMOTIVE BOOSTER MOTOR
Filed Feb. 1, 1932   3 Sheets-Sheet 1

INVENTOR
Montague H. Roberts
BY
Synnestvedt & Lechner
ATTORNEYS

Patented Dec. 24, 1935

2,025,126

UNITED STATES PATENT OFFICE 2,025,126

LOCOMOTIVE BOOSTER MOTOR

Montague H. Roberts, Englewood, N. J., assignor to Franklin Railway Supply Company, New York, N. Y., a corporation of Delaware Application February 1, 1932, Serial No. 590,067

7 Claims. (Cl. 105—115)

This invention relates to locomotive booster motors and especially to such motors or reserve power engines which are generally arranged to drive an axle either on the engine or the tender. In any event the space limitations imposed by the surrounding structures are very severe, particularly in instances where clearance must be provided in order to permit movement or swinging of the booster motor with the truck or axle when the latter pivots, as when rounding curves.

Still further, in accordance with modern practice, it is desirable to increase the power of the motor and this must be done without increasing the overall dimensions of the motor, since the space limitations remain substantially the same. Further, in accordance with modern practice, the pressure of the steam supply is relatively great, and in order to utilize the higher pressure in the booster motor it is necessary to increase the strength and wearing qualities of the operating parts without correspondingly increasing the size or overall dimensions of such parts.

With the foregoing in mind, this invention has in view making it possible, as a practical matter, to increase the total power output of the booster motor at least without materially increasing the size or dimensions of certain operating parts.

More specifically, this invention contemplates the use of a novel bearing and bracing or strengthening structure for the bearing in order to adequately distribute and care for the relatively great thrusts incident to operation of the motor particularly at a relatively high power output.

Figure 1:
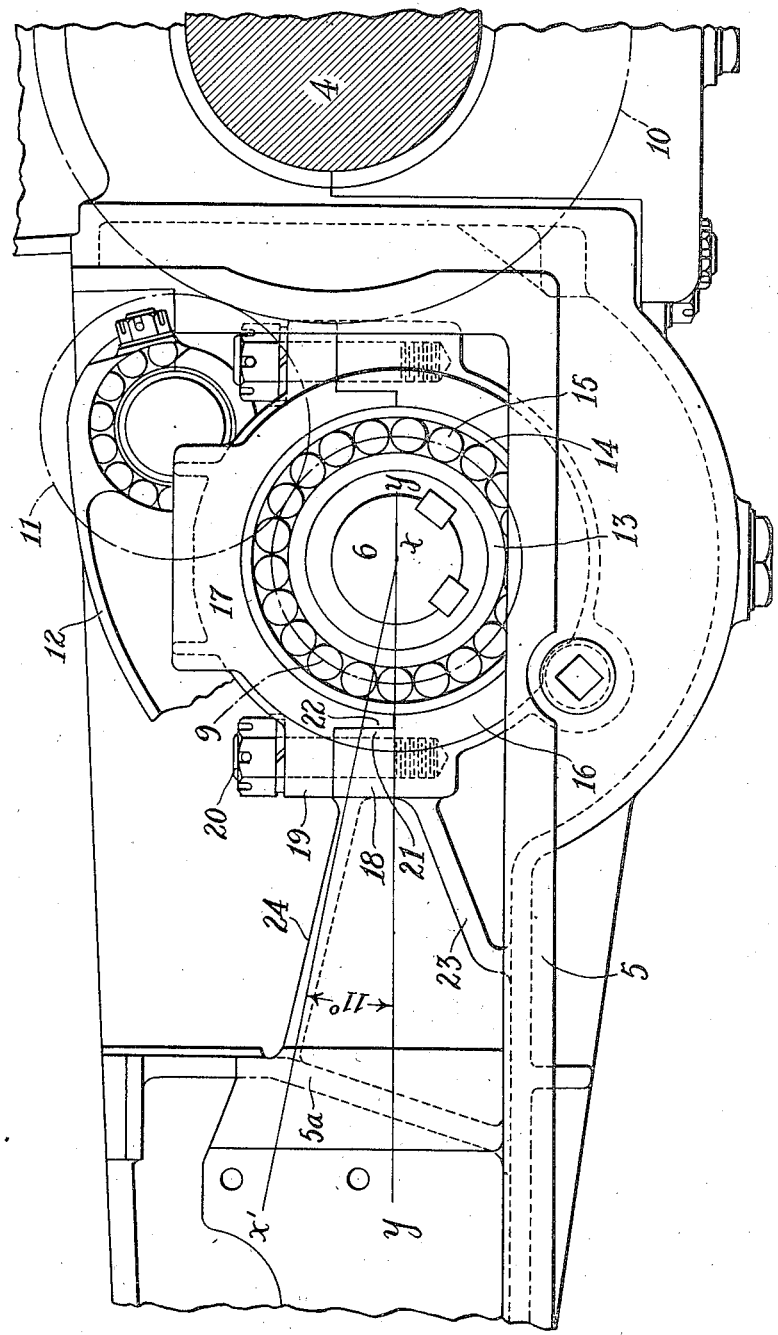
Figure 2:
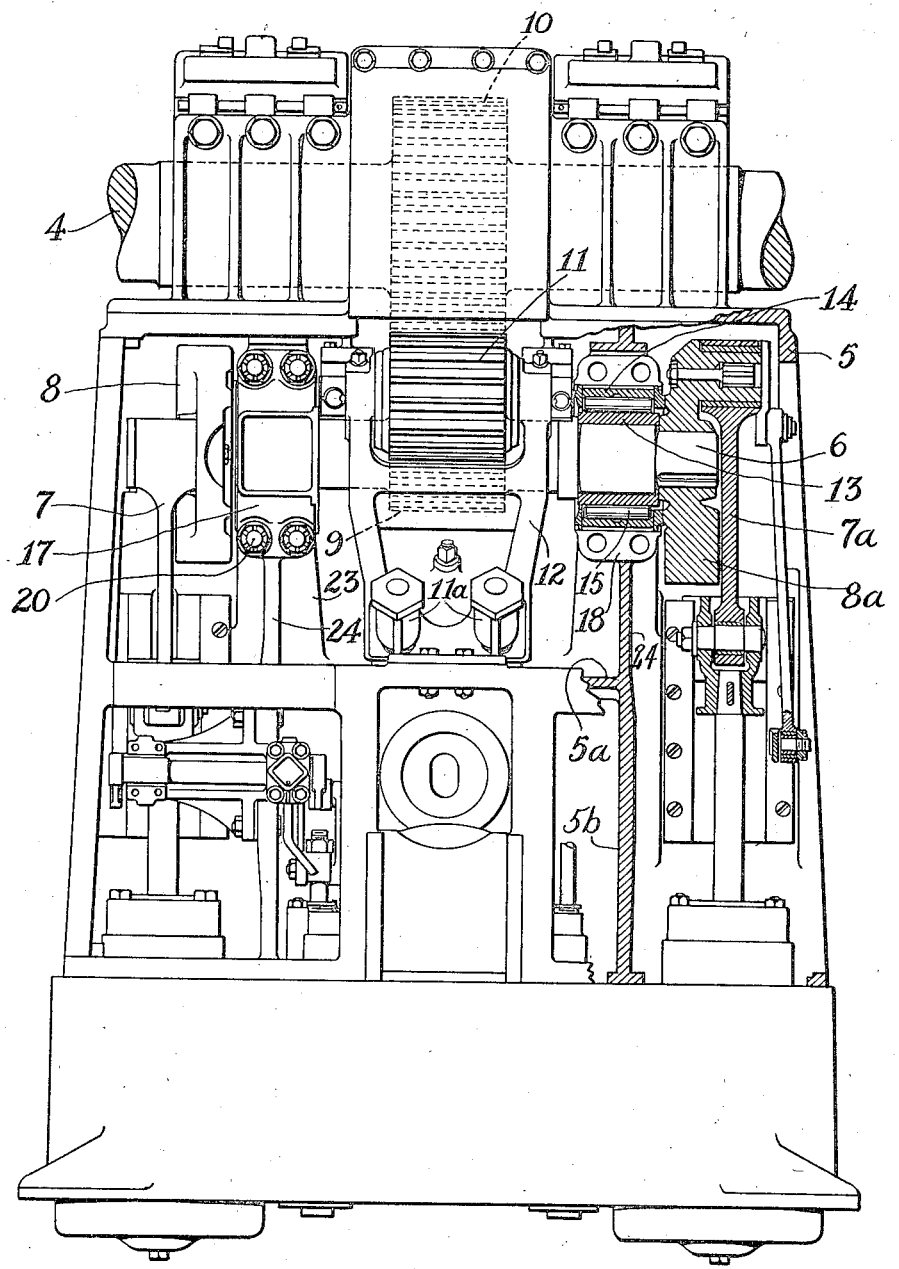
Figure 3:
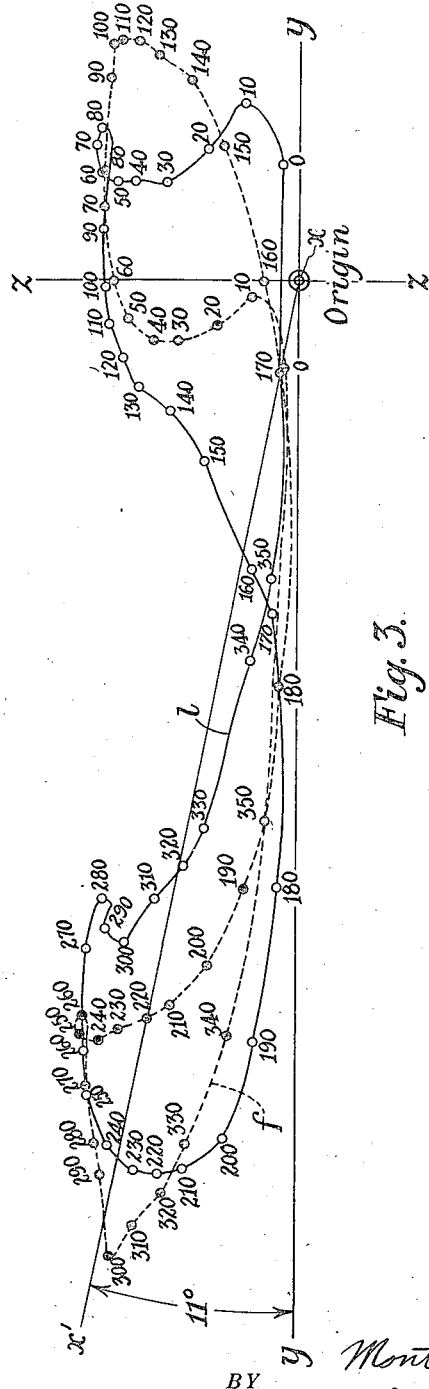

The manner in which the foregoing is accomplished, as well as how other more or less specific objects and advantages are attained, will become apparent from a consideration of the following description making reference to the accompanying drawings, in which Figure 1 is a side view of a portion of a booster motor, partly in elevation and partly in vertical section, illustrating the preferred embodiment of the present invention;

Figure 2 is a top view of portions of the structure illustrated in Figure 1, certain parts being shown in horizontal section; and Figure 3 represents a hodograph illustrating the direction and magnitude of the pressure or thrusts to which one of the bearings appearing in Figure 1 is subjected in operation of the motor.

Referring first to Figures 1 and 2, the reference numeral 4 designates an axle to be driven by the booster, such, for example, as a tender truck axle or an engine pilot or trailing truck axle. The booster motor is associated with the axle 4 for the purpose of driving the same, particularly at slow speeds and in starting, and is extended generally horizontally at one side of the axle, the motor including a base or bedplate structure 5 adapted to carry at least a major portion of the operating parts.

The motor, of course, includes one or more cylinders with pistons therein but this portion of the structure forms no part of the present invention per se and, therefore, has not been illustrated or described herein. The pistons of the motor may be coupled with the crank shaft or axle 6 by means of the connecting rods 7 and 7a and the cranks 8 and 8a. The axle or shaft 6 carries a gear indicated at 9 which is arranged to be coupled with a gear 10 carried by the axle 4 by means of the idler gear 11. A movable support 12 is preferably provided for the idler 11, the support being connected with suitable actuating mechanism 11a by means of which the gearing may be entrained and disentrained at will.

The shaft 6 is preferably provided with a plurality of spaced bearings therealong, and, in order to reduce the friction of the bearings for the crank shaft 6 and thus improve the efficiency of this portion of the motor to a point where the power delivered to the cranks 8 and 8a may be materially increased, and to accomplish this without increasing the overall dimensions of the bearing or bearings, I have employed a bearing of the roller type. Such bearings (see Figures 1 and 2) include the inner and outer races 13 and 14 with rollers 15 interposed therebetween. The bearing, as viewed in Figure 1, is positioned or journalled within a cylindrical bearing structure including a bearing block portion 16 and a bearing cap member 17.

For reasons which will be explained more fully hereinafter, the complementary bearing block and cap members 16 and 17 are split in a plane offset from the center of the shaft 6 to provide opposed lugs 18 and 19 at each side of the shaft. Bolts or studs 20 serve to secure the bearing block and cap members to each other. The configuration of the cap member 17 is clearly illustrated in Figure 1 and it will be seen that the two complementary bearing members 16 and 17 are further shouldered as at 21 and 22 in such manner as to provide abutting faces lying in a generally vertically extended plane. The bearing block member 16, which, in effect, constitutes a portion of the bedplate structure 5, is further braced or strengthened by means of reenforcing webs 23 and 24 which are preferably cast integral with the bedplate structure. As seen in Figures 1 and 2, the web 23 for each of the bearings is of substantial width transversely of the booster motor and extends from a lower portion of the lug 18 downwardly at an angle to join the bedplate structure at a point below the lug 18. On the other hand, the web 24 lies in a generally vertical plane and extends away from the bearing to join an upright portion 5a of the bedplate structure extended generally transversely of the booster motor. The upper edge of the web 24, furthermore, lies at an upwardly inclined angle so that the two webs 23 and 24 provide bracing through the angular webs to points both below and above the lug 18. An additional vertically disposed flange or web 5b extends rearwardly substantially from the point of junction of the parts 24 and 5a.

Before considering the advantages of the bearing arrangement shown in Figure 1, attention is called to the fact that the hodograph of Figure 3 illustrates the pressure vector for each of two main bearings for the crank shaft of a two cylinder booster motor. Thus, for purposes of illustration, the motor is assumed to include a pair of cylinders, the piston of one of which takes the position of the leading piston, while the piston of the other takes a following position in the two cylinder arrangement. It is further noted that the main bearings are associated with the crank shaft 6 one adjacent to each of the two cranks for the two pistons.

Bearing the foregoing in mind and also bearing in mind the fact that the center of the crank shaft 6 is the origin of the thrusts or pressure to which the bearing is subjected, it is first noted that this origin is indicated at $x$ on the hodograph of Figure 3. The line $y$—$y$, furthermore, indicates the horizontal, while the line $z$—$z$ indicates a vertical line, both of such lines being extended through the origin, i. e., the point representing the center of the shaft 6. By plotting the direction and magnitude of the pressure or thrust throughout one complete revolution of the shaft 6, in 10° increments, a curve is obtained illustrating the thrust changes encountered during one revolution.

The hodograph herein reproduced represents the pressure or thrust conditions when the motor is operating at very low speed, and the full line curve $l$ illustrates the bearing load conditions for the leading cylinder, while the dotted line curve $f$ illustrates the bearing load conditions for the following cylinder.

By inspection of the curves it will be observed that with a booster motor arranged in accordance with this invention, and geared to the driven axle 4 in the manner shown in Figure 1, all thrusts are directed upwardly above the horizontal $y$—$y$. It will further be seen that the resultant of all the forces of the leading and following curves may be represented by a line $x$—$x'$ drawn from the origin (point $x$) rearwardly and upwardly at an angle of approximately 10 or 11° to the horizontal.

By reference again to Figure 1 it will be seen that the resultant line $x$—$x'$ has also been applied to this figure and extended with respect to the horizontal $y$—$y$ at the same angle. Furthermore, it will now be seen that the resultant line passes through the abutting surfaces between the complementary shoulders 21 and 22 approximately midway between the upper and lower limits of such surfaces. By arranging the bearing block and cap members 16 and 17 in this way, therefore, the resultant thrust of the shaft 6 on the bearing is transmitted from one bearing part 22 to another bearing part 21, the said parts providing abutting faces extended in a plane generally transverse the direction of the resultant. In this way, shearing strains and the like on the bolts or securing studs 20 are eliminated and, without increase in the overall size of the bearing parts, greater thrusts may adequately be cared for.

Another feature of considerable importance is involved in the use of bearing block and cap members which are split in a plane offset from the center of the shaft 6 to provide the somewhat upwardly extended lugs 18. With this arrangement, at least a portion of the strengthening web 24, as clearly shown in Figure 1, may be extended from the lug 18 substantially along the line of the resultant $x$—$x'$ to brace the bearing to another portion of the base or bedplate structure such as indicated at 5a. The use of additional triangulated bracing webs such as shown at 23 is also facilitated.

According to the foregoing, therefore, the present invention provides for very efficient bracing particularly of the crank shaft bearings to the booster base. The structure is also arranged so as to eliminate shearing strains on the studs employed for securing the bearing block and cap members to each other and at the same time the foregoing advantages are attained in an arrangement which additionally provides for vertical separation of the bearing block and cap members to permit insertion and removal of the crank shaft 6 and its associated parts from above.

What I claim is:—

1. In combination with an axle to be driven, a booster motor, a crank shaft, gearing connecting the shaft to the axle, a booster motor base or bedplate structure, bearing means for said shaft and means bracing said bearing means to the bedplate structure, the bracing means being extended from the bearing means to a portion of the bedplate structure substantially along a line representing the resultant of all normal bearing thrusts during one revolution of the axle.

2. In combination with an axle, a booster motor for driving the axle extended generally horizontally at one side thereof, the motor including gearing, a shaft for a gear, a base or bedplate structure, and a bearing for said shaft, in which construction a line representing the direction of the resultant of all thrusts on the bearing during one revolution of the shaft extends from the center of the shaft at an angle to the horizontal, said bearing being split generally horizontally into bearing cap and block members to facilitate removal of the shaft, and the bearing cap and block members having complementary interengaging shoulder portions presenting abutting faces which intersect said direction line.

3. In combination with an axle, a booster motor for driving the axle extended generally horizontally at one side thereof, the motor including gearing, a shaft for a gear, a base or bedplate structure, and a bearing for said shaft, in which construction a line representing the direction of the resultant of all thrusts on the bearing during one revolution of the shaft extends from the center of the shaft at an angle to the horizontal, said bearing being split generally horizontally into bearing cap and block members to facilitate removal of the shaft, and the bearing cap and block members having complementary interengaging shoulder portions presenting abutting faces which intersect said direction line, together with means interbracing said bearing and a portion of the bedplate structure generally along the said direction line.

4. Booster motor equipment including, in combination with an axle to be driven, a booster motor extended generally horizontally at one side of said axle, a crank shaft for the motor, gearing connecting said shaft and said axle, and a bearing for the crank shaft incorporating generally horizontally split block and cap members which are shouldered to provide abutting surfaces lying in a generally upright plane intersecting a line representing the resultant of all normal bearing thrusts during one revolution of the crank shaft, said abutting surfaces having areas extending an appreciable distance on each side of said line.

5. Booster motor equipment including, in combination with an axle to be driven, a booster motor extended generally horizontally at one side of said axle, a bedplate for the motor, a crank shaft for the motor, gearing connecting said shaft and said axle, and a bearing for the crank shaft incorporating generally horizontally split block and cap members which are shouldered to provide abutting surfaces lying in a generally upright plane intersecting a line representing the resultant of all normal thrusts during one revolution of the crank shaft, said abutting surfaces having areas extending an appreciable distance on each side of said line, and a bracing web interconnecting a shouldered portion of one of said members and the booster bedplate, said bracing web being secured to said shouldered portion at a point in alignment with said thrust line.

6. Booster motor equipment including, in combination with an axle to be driven, a booster motor extended generally horizontally at one side of said axle, a bedplate for the motor, a crank shaft for the motor, gearing connecting said shaft and said axle, and a bearing for the crank shaft incorporating generally horizontally split block and cap members which are shouldered to provide abutting surfaces lying in a generally upright plane intersecting a line representing the resultant of all normal thrusts during one revolution of the crank shaft, said abutting surfaces having areas extending an appreciable distance on each side of said line, and a bracing web interconnecting a shouldered portion of one of said members and the booster bedplate, said bracing web being secured to said shouldered portion at a point in alignment with said thrust line, and further having a portion extended from said point to the bedplate in alignment with said thrust line.

7. Booster motor equipment including, in combination with an axle to be driven, a booster motor extended generally horizontally at one side of said axle, a bedplate for the motor, a crank shaft for the motor, gearing connecting said shaft and said axle, and a bearing for the crank shaft incorporating generally horizontally split block and cap members which are shouldered to provide abutting surfaces lying in a generally upright plane intersecting a line representing the resultant of all normal thrusts during one revolution of the crank shaft, said abutting surfaces having areas extending an appreciable distance on each side of said line, and a bracing web interconnecting a shouldered portion of one of said members and the booster bedplate, said bracing web having a portion thereof extended in alignment with said thrust line.

MONTAGUE H. ROBERTS.